United States Patent
Kohara et al.

[11] Patent Number: 6,166,474
[45] Date of Patent: Dec. 26, 2000

[54] MOLDED STATOR CORE FOR ELECTRIC MOTOR

[75] Inventors: Hisayoshi Kohara; Tsuyoshi Shiga, both of Nagoya; Kinya Hayashi, Toki; Masami Endou, Handa; Yoshiyasu Gotou, Gifu, all of Japan

[73] Assignee: Kabushiki Kaisha Toshiba, Kawasaki, Japan

[21] Appl. No.: 09/376,720

[22] Filed: Aug. 17, 1999

[30] Foreign Application Priority Data

Aug. 17, 1998 [JP] Japan ................. 10-230642

[51] Int. Cl.[7] ........................................ H02K 1/22
[52] U.S. Cl. ................ 310/258; 310/259; 310/42; 310/43; 310/216; 310/179; 29/596; 29/598
[58] Field of Search .................... 310/258, 259, 310/42, 43, 45, 179, 185, 193, 216, 218; 29/596, 598, 605, 606

[56] References Cited

U.S. PATENT DOCUMENTS

| | | |
|---|---|---|
| 3,831,268 | 8/1974 | Boyd et al. ................... 29/598 |
| 4,015,154 | 3/1977 | Tanaka et al. ................. 310/42 |
| 4,182,026 | 1/1980 | Searle ........................... 29/596 |
| 4,712,035 | 12/1987 | Forbes et al. ................ 310/67 R |
| 5,493,162 | 2/1996 | Wuerth et al. ................ 310/218 |
| 5,598,046 | 1/1997 | Miyazawa et al. ........... 310/49 R |
| 5,834,873 | 11/1998 | Muller ........................... 310/186 |
| 6,020,661 | 2/2000 | Trago et al. ................... 310/43 |

Primary Examiner—Nestor Ramirez
Assistant Examiner—Thanh Lam
Attorney, Agent, or Firm—Pillsbury Madison & Sutro LLP

[57] ABSTRACT

A molded stator core for an electric motor includes a stator core including a yoke and a plurality of teeth formed on an outer periphery of the yoke, the teeth having different types, and a covering member covering substantially the overall stator core and molded from an insulating resin by pouring the resin through a plurality of gates disposed so as to correspond to the yoke. In the molded stator core, an amount of resin axially flowing from each gate to the corresponding tooth of a first type is approximated to an amount of resin axially flowing from each gate to the corresponding tooth of a second type.

30 Claims, 13 Drawing Sheets

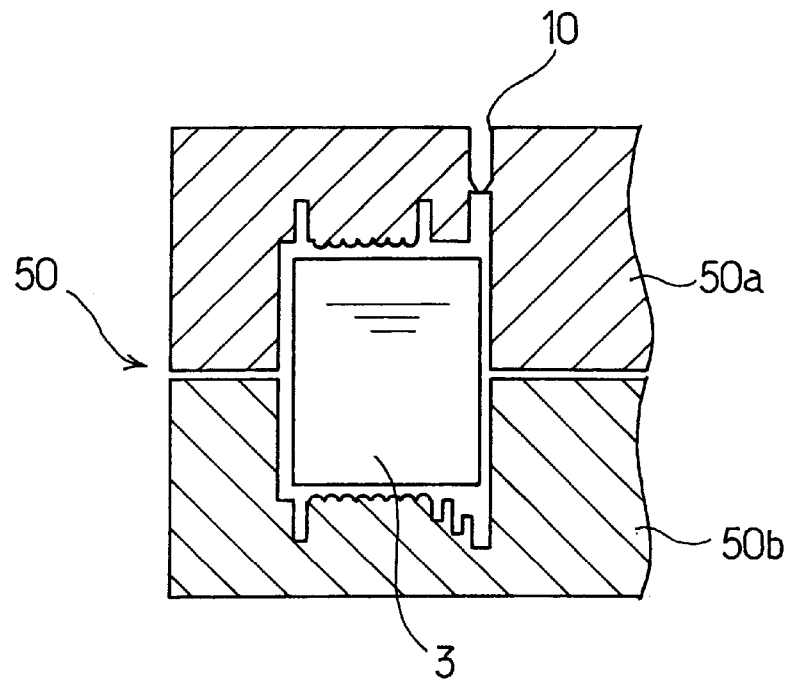
F I G. 1 1
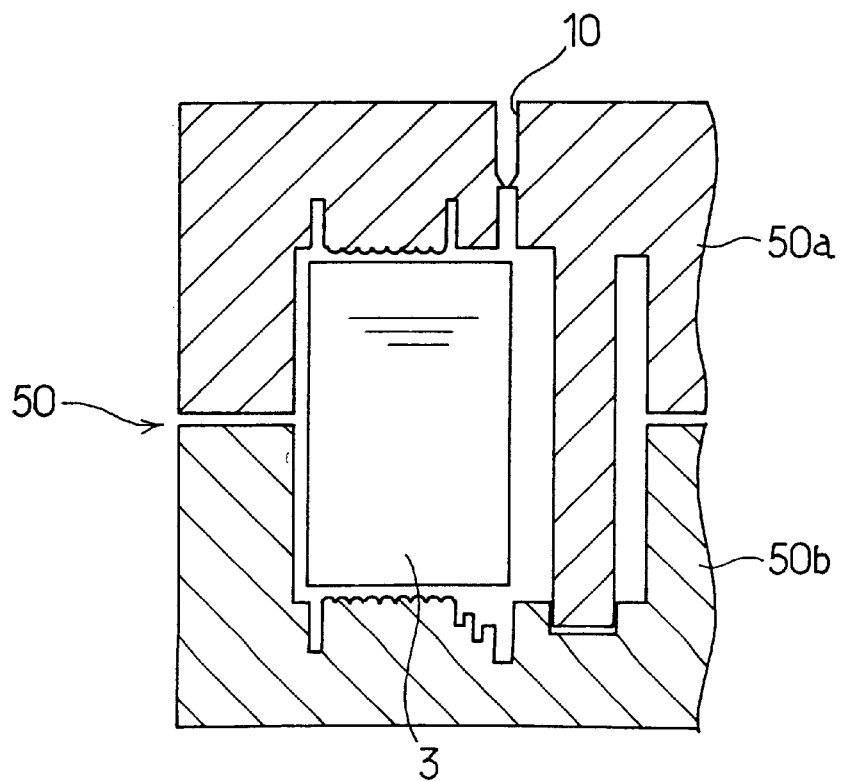
F I G. 1 2

MOLDED STATOR CORE FOR ELECTRIC MOTOR

BACKGROUND OF THE INVENTION

1. Field of the invention

This invention relates generally to a stator of an electric motor including a yoke and a plurality of teeth on an outer circumference of the yoke, and more particularly to a molded stator core covered with a covering member molded from an insulating resin.

2. Description of the prior art

A stator of an electric motor conventionally includes a stator core made by stacking a number of steel sheets each of which is punched out into a predetermined shape and an insulating end plate made separately from the stator core and attached to the stator core. A winding is wound on each tooth of the stator core covered with the end plate. However, a work for assembling the insulating end plate onto the stator core requires much labor and accordingly, is troublesome. Particularly in a stator core having a large number of teeth, the shape of the end plate is complex and accordingly, the assembling work is further troublesome, resulting in an increase in a manufacturing cost of the stator core and accordingly, of the motor.

SUMMARY OF THE INVENTION

Therefore, an object of the present invention is to provide a molded stator core for an electric motor wherein the stator core is covered with a covering member molded from an insulating resin so that the work for assembling the end plate to the stator core is eliminated.

The present invention provides a molded stator core for an electric motor comprising a stator core including a yoke and a plurality of teeth formed on an outer periphery of the yoke, the teeth having different types, and a molded from an insulating resin so as to cover member covering substantially the overall stator core before windings are wound thereon. In the molded stator core, an amount of resin covering each tooth of a first type is approximated to an amount of resin covering each tooth of a second type.

According to the above-described construction, the stator core is covered with the covering member molded from the insulating resin. Consequently, the work for assembling the separately formed insulating end plate to the stator core can be eliminated.

In a case where the covering member is molded from the resin so as to cover the stator core including a plurality of teeth of different types, an amount of resin flowing to each tooth of one type is larger than an amount of resin flowing to each tooth of the other type when the thicknesses of portions of the covering member covering the respective teeth are the same. With respect to each tooth of said one type, the resin generally tends to flow from the gate to the distal end side of the tooth easily. On the other hand, the resin is hard to flow from the gate to the distal end side of each tooth of said other type. Accordingly, a sufficient amount of resin does not flow to the side of each tooth where the resin is hard to flow, so that some portions are not covered with the covering member. On the other hand, an increase in a molding pressure or a pressure of the molten resin sometimes results in burrs at the side of each tooth where the resin tends to flow easily.

In the above-described construction, however, an amount of resin axially flowing from each gate to the corresponding tooth of the first type is approximated to an amount of resin axially flowing from each gate to the corresponding tooth of the second type, so that amounts of resin flowing from the gates to the teeth and flowability are uniformed. Consequently, occurrence of portions not covered with the covering member and burrs can be prevented and the moldability of the covering member can be Improved.

The invention also provides a molded stator core for an electric motor comprising a stator core including a yoke and a plurality of teeth formed on an outer periphery of the yoke, the teeth having different types, a molded from an insulating resin so as to cover member covering substantially the overall stator core before windings are wound thereon, and a mounting portion provided integrally with the covering member so as to be located at an inner peripheral side of the yoke. In this molded stator core, an amount of resin in a portion of the covering member provided with the mounting portion near the yoke is larger than an amount of resin in another portion of the covering member provided with no mounting portion near the yoke.

Since the stator core is covered with the covering member molded from the insulating resin in the above-described construction, too, the work for assembling the separately formed insulating end plate to the stator core can be eliminated.

A problem arises in a case where the mounting portions are formed integrally with the covering member so as to be disposed inside the yoke when the covering member is molded so as to cover the stator core having the teeth on the outer periphery thereof. That is, the resin is hard to flow to the tooth side during the molding of the covering member in a region where the mounting portions are provided since the resin also flows to the mounting portion side. On the other hand, in a region where the no mounting portion is provided, the resin flows easily to the tooth side. This results in the stator partially covered with the covering member and occurrence of burrs.

In the above-described construction, however, an amount of resin of the covering member near the yoke is larger in the portion where the mounting portions are provided than in the other portion where no mounting portions are provided. This causes the resin to easily flow to the tooth side corresponding to the portion where the mounting portions are provided. Consequently, occurrence of portions covered with the covering member and burrs can be prevented and the moldability of the covering member can be improved.

The invention further provides a molded stator core for an electric motor comprising a stator core including a yoke having an inner diameter equal to or larger than 100 mm and a plurality of teeth formed on an outer periphery of the yoke, the teeth having different types, and a molded from an insulating resin so as to cover member covering substantially the overall stator core before windings are wound thereon, and a mounting portion provided integrally with the covering member so as to be located at an inner peripheral side of the yoke. In this construction, an amount of resin covering each tooth of a first type is approximated to an amount of resin covering each tooth of a second type, and an amount of resin in a portion of the covering member provided with the mounting portion near the yoke is larger than an amount of resin in another portion of the covering member provided with no mounting portion near the yoke. Consequently, the same effect can be achieved from this construction as that described above.

The invention further provides a molded stator core for an electric motor comprising a stator core including a yoke and a plurality of teeth formed on an outer periphery of the yoke, the teeth having different types, a molded from an insulating resin so as to cover member covering substantially the overall stator core before windings are wound thereon, and a plurality of ribs provided integrally with the covering member so as to extend continuously from the yoke to distal ends of the corresponding teeth respectively.

In the above-described construction, too, the stator core is covered with the covering member molded from the insulating resin in the above-described construction, too, the work for assembling the separately formed insulating plate to the stator core can be eliminated.

The resin is hard to flow to the distal end of each tooth away from the gate when the stator having the teeth formed on the outer periphery thereof is covered with the covering member. As a result, a sufficient amount of resin does not flow to the side of each tooth where the resin is hard to flow, so that some portions are not covered with the covering member. On the other hand, the burrs occur at the side of each tooth where the resin tends to flow easily.

In the above-described construction, however, the covering member has an integrally formed rib continuously extending from each gate to the distal end of the corresponding tooth. The resin easily flows along the rib from each gate to the distal end of the corresponding tooth. Consequently, since occurrence of portions covered with the covering member and burrs can be prevented, the moldability of the covering member can be improved.

BRIEF DESCRIPTION OF THE DRAWINGS

Other objects, features and advantages of the present invention will become clear upon reviewing the following description of the preferred embodiments, made with reference to the accompanying drawings, in which:

FIG. 11 is a longitudinal section of a molding die assembly in which the stator core is accommodated;

FIG. 12 is a view similar to FIG. 11, showing a case where the stator core has a mounting portion;

DETAILED DESCRIPTION OF THE PREFERRED EMBODIMENTS

Figure 1:
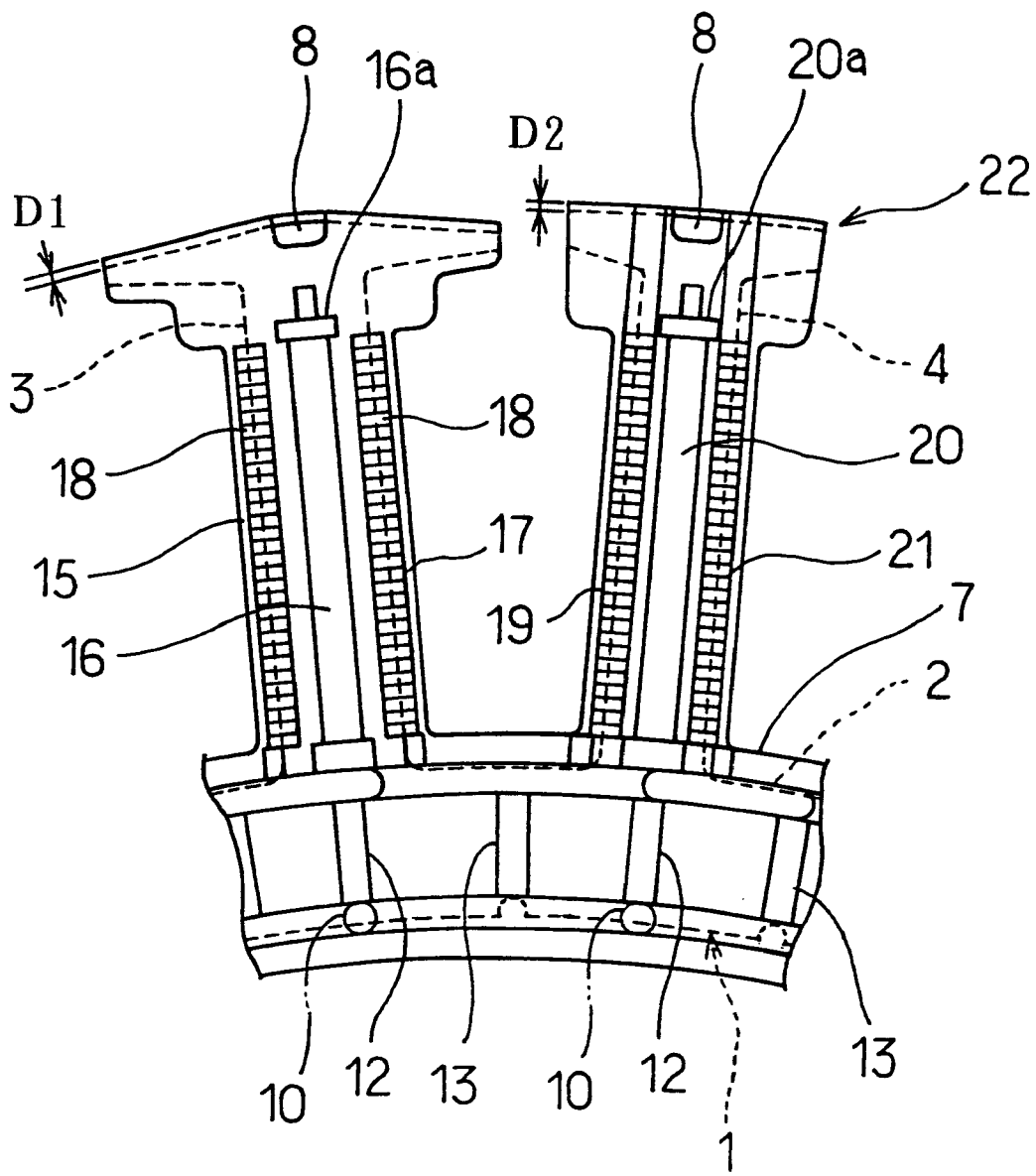
FIG. 1 is a partial plan view of a stator core of a first embodiment to which the molded stator core in accordance with the present invention is applied.

A first embodiment of the present invention will be described with reference to FIGS. 1 to 4, 11 and 12. In the embodiment, the present invention is applied to a stator core of an electric motor of the outer rotor type. Referring first to FIG. 4, the stator core 1 is shown as before a covering member is formed thereon by the molding. The stator core 1 comprises an annular yoke 2 and a number of teeth 3 and 4 formed on an outer circumference of the yoke 2 so as to protrude radially. The stator core 1 is formed by circumferentially connecting via connecting portions 6 a plurality of divided cores 5. Each divided core 5 is formed by punching and stacking a number of silicon steel sheets. Each connecting portion 6 includes a fitting convex portion 6a formed on an end of the yoke 2 of one of divided cores 5 adjacent to each other and a fitting groove portion 6b formed in an end of the yoke 2 of the other adjacent divided core 5. The convex portion 6a is engaged with the groove portion 6b so that each connecting portion 6 is formed. The yoke 2 has an inner diameter A (see FIG. 3) set at or above 100 mm, about 150 mm in the embodiment.

The above-described stator core 1 includes a plurality of pairs of circumferentially alternately arranged teeth 3 and 4 adjacent each other having types or more specifically configurations different from each other. More specifically, each larger tooth 3 includes a body 3a and a head 3b both having circumferential widths B1 and C1 respectively, whereas each smaller tooth 4 includes a body 4a and a head 4b both having circumferential widths B2 and C2 respectively, as shown in FIG. 4. The width B1 of the body 3a of each tooth 3 is set to be larger than the width B2 of the body 4a of each tooth 4. The width C1 of the head 3b of each tooth 3 is set to be larger than the width C2 of the head 4b of each tooth 4.

A covering member 7 is molded from an insulating resin so as to cover substantially overall outer faces of the yoke 2 and the teeth 3 and 4. A material for the insulating resin molded into the covering member 7 comprises a mixture of polyphenylenesulfide (PPS) having a high heat resistance and serving as a main component and glass powder. More specifically, the glass has a mixture ratio ranging 20 to 30 percentage by weight, a melt viscosity ranging 150 to 200 Pa•s, a bending elastic modulus ranging 5000 to 10000 MPa, and a melt flow rate (MFR) ranging 15 to 50 g/10 min.

Measurement of the bending elastic modulus, the melt viscosity and the melt flow rate was based on the standard of the American society for Testing and Materials (ASTM). More specifically, the bending elastic modulus was measured on the basis of ASTM-D-790. The melt viscosity was measured on the basis of ASTM-D-3835. The melt flow rate was measured on the basis of ASTM-D-1238. The conditions of measurement of the melt viscosity include the one where the temperature of the melted material is 310° C. and the one where the speed of a pressing member is 1216 mm/s. Further, the conditions of measurement of the melt flow rate include the one where the temperature of the melted material is 315.5° C., the one where a nozzle has a diameter of 2.0995 mm, the one where the nozzle has a length of 8 mm, and the one where a staying period is 5 minutes.

The covering member 7 has a number of support exposed portions 8 and 9 corresponding to supporting portions for supporting the stator core 1 in a molding die assembly 50 (see FIGS. 11 and 12) in the molding of the covering member 7. The outer circumferential support exposed portions 8 are disposed so as to correspond to distal ends of the teeth 3 and 4. The inner circumferential support exposed portions 9 are disposed at a plurality of locations on the inner circumference of the yoke 2.

Figure 3:
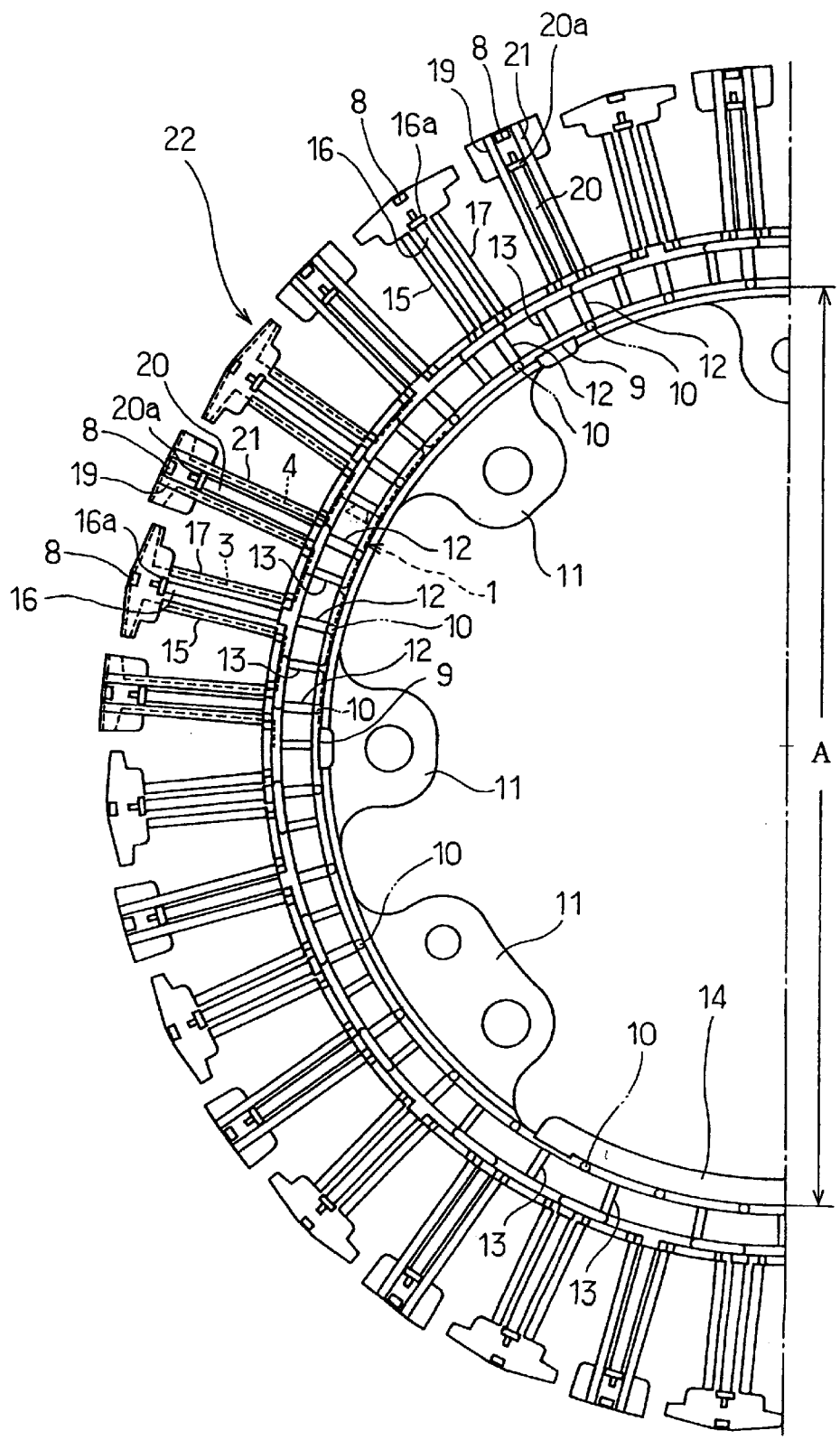
FIG. 3 is a plan view of one half of the stator core.
Figure 4:
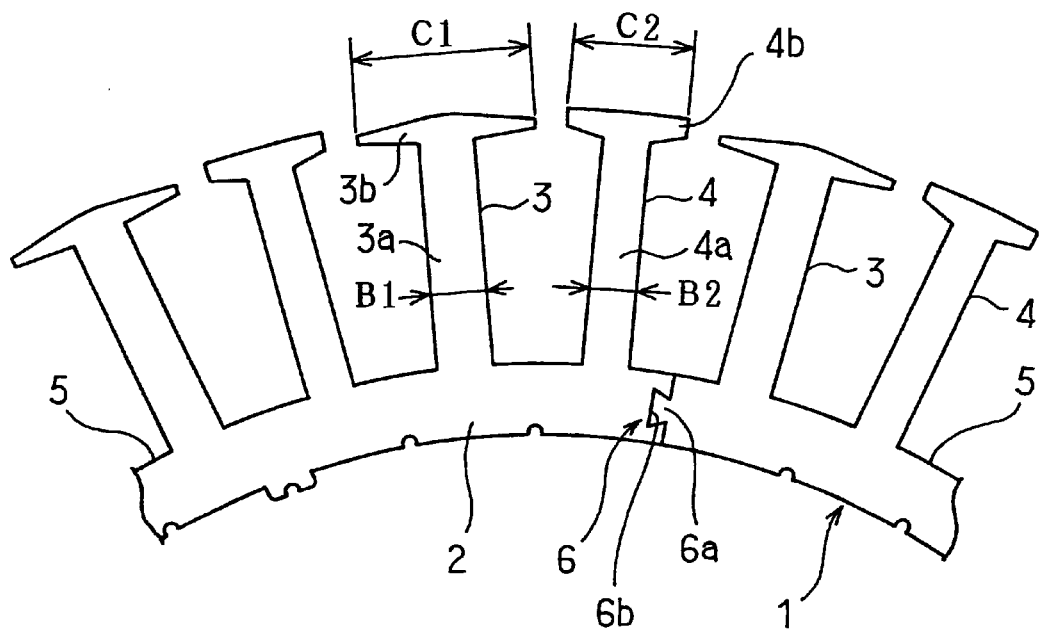
FIG. 4 is a schematic partial plan view of the stator core.

The molding die assembly 50 is formed with a number of gates 10 through which the molten resin is poured into the interior thereof, as shown in FIGS. 1 and 3. The gates 10 are disposed so as to correspond to the centers of the teeth 3 and 4 near the inner circumference of the yoke 2 respectively. The covering member 7 has a plurality of mounting portions 11 located at the inner circumferential side of the yoke 2 as shown in FIG. 3. The mounting portions 11 are used to mount the stator core 1 on a mechanism section of a washing machine (not shown), for example.

Ribs 12 are provided on portions of the covering member 7 which are near an axial end face of the yoke 2 and correspond to the mounting portions 11 and other portions near the aforesaid portions, respectively. The ribs 12 serves as resin guiding members for guiding the resin from the gates 10 toward the teeth 3 and 4 side as well as strengthening members. Ribs 13 are further provided between the ribs 12. The ribs 12 are disposed so as to extend between the gates 10 and proximal ends of the corresponding teeth 3 or 4 respectively. The ribs 13 are disposed so as to extend between the inner and outer circumferences of the yoke 2 between each tooth 3 and the tooth 4 corresponding to the tooth 3.

No gates 10 nor ribs 12 are provided on portions of the covering member 7 which are near an axial end face of the yoke 2 and which are formed with no mounting portions 11, as shown in FIG. 3. Only the ribs 13 are provided in these portions. Further, a thicker portion 14 is formed integrally on a portion of the covering member 7 which is located at the inner circumferential side of the yoke 2 and is formed with no mounting portions 11, as shown in FIG. 3. The thicker portion 14 is thicker than the other portion of the covering member 7.

Figure 2:
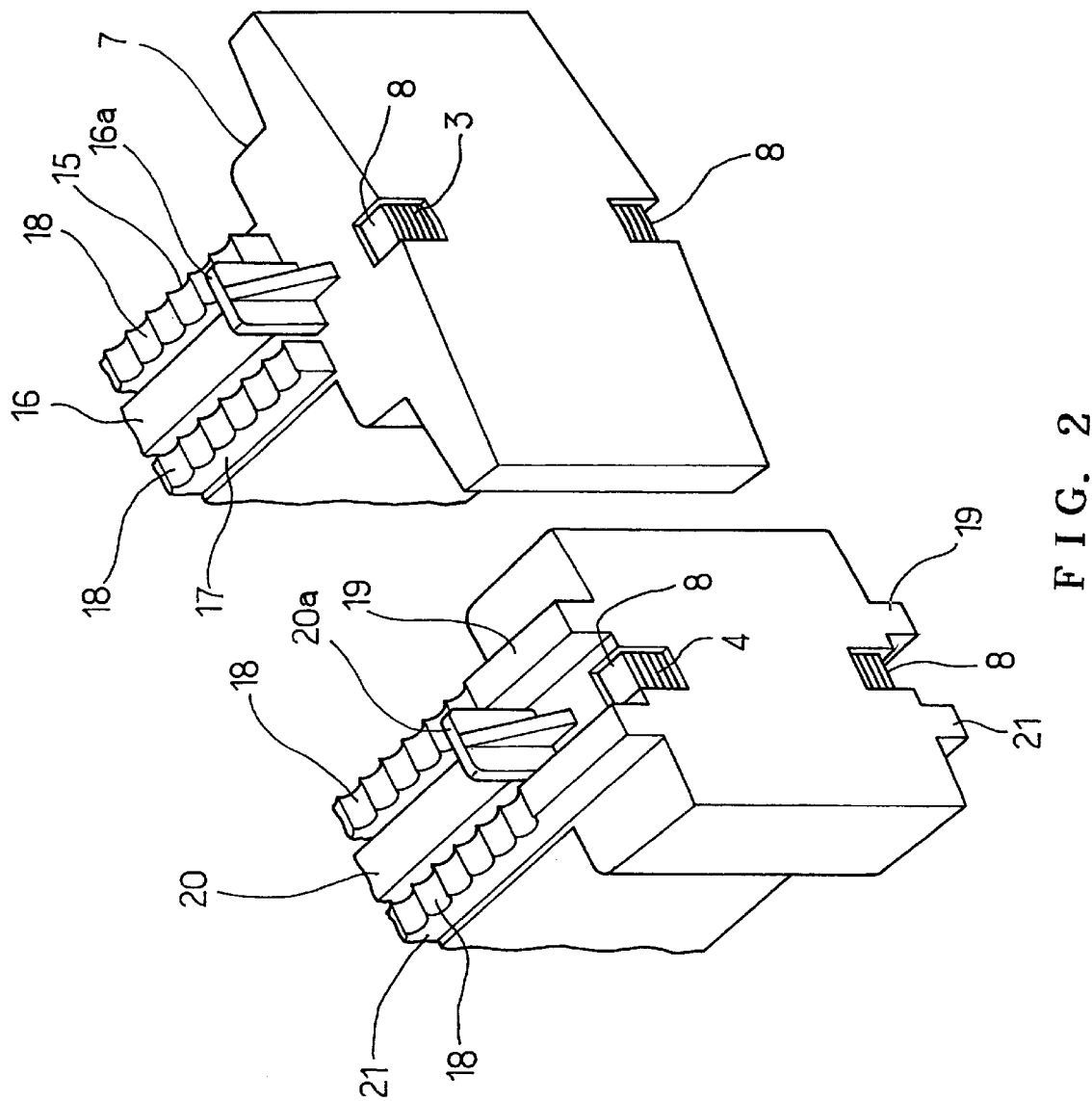
FIG. 2 is a partial perspective view of larger and smaller teeth of the stator core.

Three ribs 15, 16 and 17 extending along the body 3a are integrally formed with portions of the covering member 7 near the axial end face of each larger tooth 3 as shown in FIG. 1. The ribs 15 and 17 located at both sides have winding grooves 18, respectively, as shown in FIGS. 1 and 2. The ribs 15, 16 and 17 extend from the proximal end of each tooth 3 to the distal end thereof. The central rib 16 has a distal end provided with a limiting convex portion 16a for limiting the position of the winding.

Further, three ribs 19, 20 and 21 extending along the body 4a are integrally formed with portions of the covering member 7 near the axial end face of each smaller tooth 4. The ribs 19 and 21 located at both sides have winding grooves 18, respectively. The ribs 19, 20 and 21 extend from the proximal end of each tooth 4 to the distal end of the head 4b or the distal end of the tooth 4. The central rib 20 has a distal end provided with a limiting convex portion 20a for limiting the position of the winding.

The covering member 7 covers an outer peripheral face of the distal end of each of the teeth 3 and 4 except the supporting exposed portion 8. A distance between the center of the yoke 2 and the outer peripheral face of the distal end of each tooth 3 is set to be slightly longer than a distance between the center of the yoke 2 and the outer peripheral face of the distal end of each tooth 4, as shown in FIG. 1. Further, a portion of the covering member 7 covering the outer peripheral face of the distal end of each tooth 3 has a thickness D1 slightly larger than a thickness D2 of a portion of the covering member 7 covering the outer peripheral face of the distal end of each tooth 4. The above-described ribs 12, 13, 15 to 17 and 19 to 21, and winding grooves 18 are provided at both axial ends of the stator core 1.

The molding of the covering member 7 on the stator core 1 will now be described with reference to FIGS. 11 and 12. First, the stator core 1 is accommodated in a space defined by upper and lower dies 50a and 50b both constituting a molding die assembly 50, as shown in FIG. 11. The stator core 1 is supported on a supporting portion (not shown) in the molding die assembly 50. Thereafter, molten resin (the material for the covering member 7) is poured through the gates 10 into the die assembly 50. The molten resin fills the space so as to cover the outer faces of the yoke 2 and the teeth 3 and 4. The molten resin is then hardened such that the covering member 7 is formed so as to cover the outer face of the stator core 1. At this time, the mounting portions 11 are formed integrally with the covering member 7 on the inner circumferential side of the yoke 2. The molding die assembly 50 is removed after the resin has been hardened, whereby the molding is completed and the molded stator core 22 is obtained.

Windings (not shown) are wound on the teeth 3 and 4 of the molded stator core 22 using the winding grooves 18, so that the molded stator core is constructed into a stator for a motor of the outer rotor type. The windings are readily wound using the winding grooves 18. Further, since the winding grooves 18 are formed in the ribs 15, 17, 19 and 21 formed integrally with the covering member 7, no other members are required.

According to the above-described construction, the stator core 1 is covered with the covering member 7 made from the insulating resin by way of molding. Consequently, the work for assembling the separately formed insulating end plate to the stator core can be eliminated. This reduces a manufacturing cost of the stator core. Further, the covering member 7 covers each of the teeth 3 and 4 to the extent of the outer periphery of the distal end of each tooth. Consequently, since the outer periphery of the distal end of each of the teeth 3 and 4 is hardly exposed, occurrence of rust can be prevented. Additionally, the covering member 7 is provided with the ribs 12, 15 to 17 and 19 to 21 extending from each gate 10 along the respective corresponding teeth 3 and 4. Consequently, since the molten resin flows smoothly to the tooth 3 or 4 side during the molding of the covering member 7, the moldability thereof can be improved.

The following problem arises when the covering member 7 is molded from the resin so as to cover the stator core 1 including a plurality of teeth 3 and 4 having the configurations different from each other. More specifically, for example, when the thicknesses of portions of the covering member 7 covering the respective teeth 3 and 4 are the same, an amount of resin flowing to each larger tooth 3 is larger than an amount of resin flowing to each smaller tooth 4. The resin generally tends to flow from the gate 10 to the distal end side of the tooth 3 easily, whereas the resin is hard to flow from the gate 10 to the distal end side of the tooth 4. Accordingly, a sufficient amount of resin does not flow to the side of each tooth 4 where the resin is hard to flow, so that some portions are not covered with the covering member 7. On the other hand, an increase in a molding pressure or a pressure of the molten resin sometimes results in burrs at the side of each tooth 3 where the resin tends to flow easily.

In order that the above-described problem may be solved, the ribs 19 and 21 disposed at both sides of each smaller tooth 4 respectively extend to the distal end of the tooth 4, so as to be longer than the ribs 15 and 17 disposed at both sides of each larger tooth 3. Accordingly, an amount of resin flowing along the ribs 19 to 21 or a sectional area of the resin is larger than an amount of resin flowing along the ribs 15 to 17. As a result, an amount of resin axially flowing from each gate 10 to the corresponding tooth 4 is approximated to an amount of resin axially flowing from each gate 10 to the corresponding tooth 3, so that amounts of resin flowing from the gates 10 to the teeth 3 and 4 and flowability are uniformed. Consequently, occurrence of portions not covered with the covering member 7 and burrs can be prevented and the moldability of the covering member 7 can be improved. Moreover, an amount of resin molded into the covering member 7 can easily be adjusted. The above-mentioned amount of resin axially flowing from each gate 10 to the corresponding tooth 3 or 4 refers to a total amount of resin molded into the covering member 7 covering the tooth 3 or 4 extending axially from the yoke 2.

The covering member 7 covers each of the teeth 3 and 4 to the extent of the outer periphery of the distal end. The thickness of the portion of the covering member 7 covering the distal end of each tooth 4 is smaller than that of the portion of the covering member 7 covering the distal end of each tooth 3. The ribs 19 and 21 located at both sides of each tooth 4 extend to the distal end of each tooth 4. Consequently, since the resin flows sufficiently to the distal end of each tooth 4, the moldability of the covering member 7 can further be improved.

The following problem arises in a case where the mounting portions 11 are formed integrally with the covering member 7 so as to be disposed inside the yoke 2 when the covering member 7 is molded so as to cover the stator core 1 having the teeth 3 and 4 on the outer circumference thereof. That is, the resin is hard to flow to the tooth 3 or 4 side during the molding of the covering member 7 in a region where the mounting portions 11 are provided since the resin also flows to the mounting portion 11 side. On the other hand, in a region where no mounting portion 11 is provided, the resin flows easily to the tooth 3 or 4 side. This results in the stator partially covered with the covering member 7 and occurrence of burrs.

In the above-described embodiment, however, the ribs 12 serving as the resin guiding members guiding the resin from the gates 10 toward the teeth 3 and 4 side are provided on the portions of the covering member 7 which are near the axial end face of the yoke 2 and correspond to the mounting portions 11 and other portions near the aforesaid portions, respectively. No ribs 12 are provided on the other portion of the covering member 7 where no mounting portions 11 are mounted. Accordingly, an amount of resin of the covering member 7 near the yoke 2 is larger in the portion where the mounting portions 11 are provided than in the other portion where no mounting portions are provided. This causes the resin to easily flow to the tooth 3 or 4 side corresponding to the portion where the mounting portions 11 are provided. Consequently, occurrence of portions covered with the covering member 7 and burrs can be prevented and the moldability of the covering member 7 can be improved.

Further, the thicker portion 14 is formed integrally on the portion of the covering member 7 which is located at the inner circumferential side of the yoke 2 and is formed with no mounting portions 11. The resin easily flows to the thicker portion 14 side and further to the axially opposed end side through the thicker portion 14. Consequently, the moldability of the covering member 7 can further be improved. Additionally, the aforesaid material for the covering member 7 improves the moldability and the quality of the covering member. The invention is advantageous when the inner diameter of the yoke 2 of the stator core 1 is equal to or above 100 mm.

Figure 5:
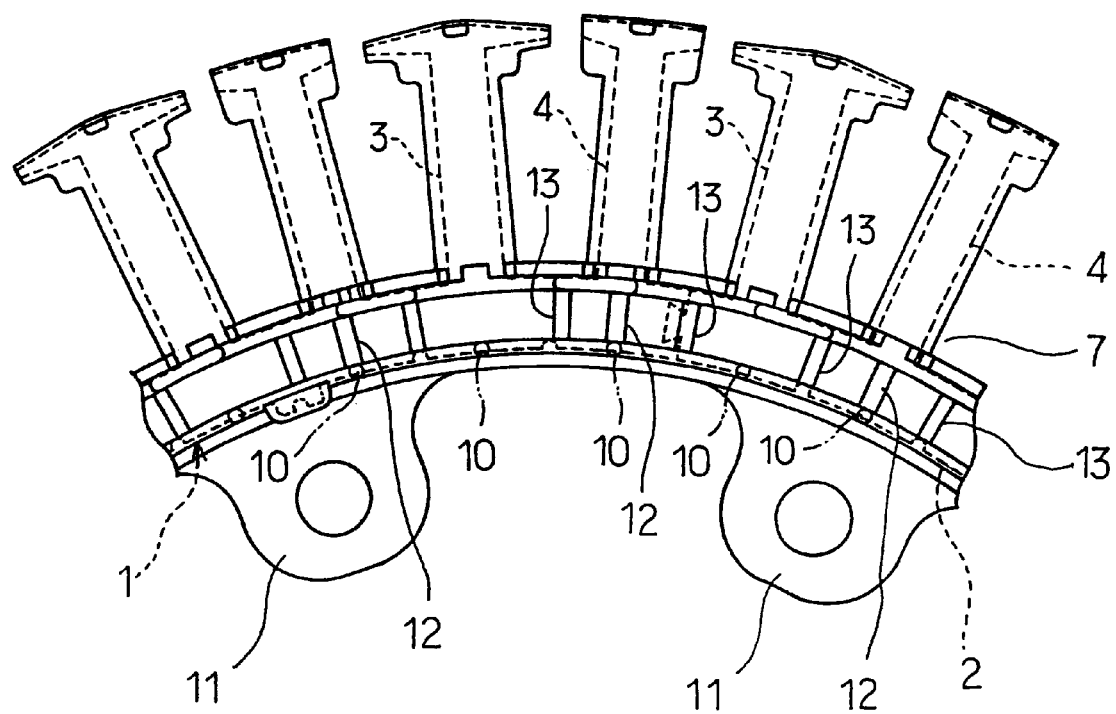
FIG. 5 is a partial plan view of a stator core of a second embodiment to which the molded stator core in accordance with the present invention is applied.

FIG. 5 illustrates a second embodiment of the invention. In the second embodiment, the covering member 7 is provided with ribs 12 between the gates 10 and the respective smaller teeth 4 near the axial end face of the yoke 2. No ribs 12 are provided between the gates 10 and the respective larger teeth 3. Accordingly, an amount of resin of the covering member 7 near the axial end face of the yoke 2 is larger around each tooth 4 than around each tooth 3. The covering member 7 near the axial end faces of the teeth 3 and 4 is provided with no ribs 15 to 17 and 19 to 21, respectively.

As the result of the above-described construction, an amount of resin axially flowing from each gate 10 to the corresponding tooth 4 is approximated to an amount of resin axially flowing from each gate 10 to the corresponding tooth 3, so that amounts of resin flowing from the gates 10 to the teeth 3 and 4 and flowability are uniformed. Consequently, occurrence of portions not covered with the covering member 7 and burrs can be prevented and the moldability of the covering member 7 can be improved.

Figure 6:
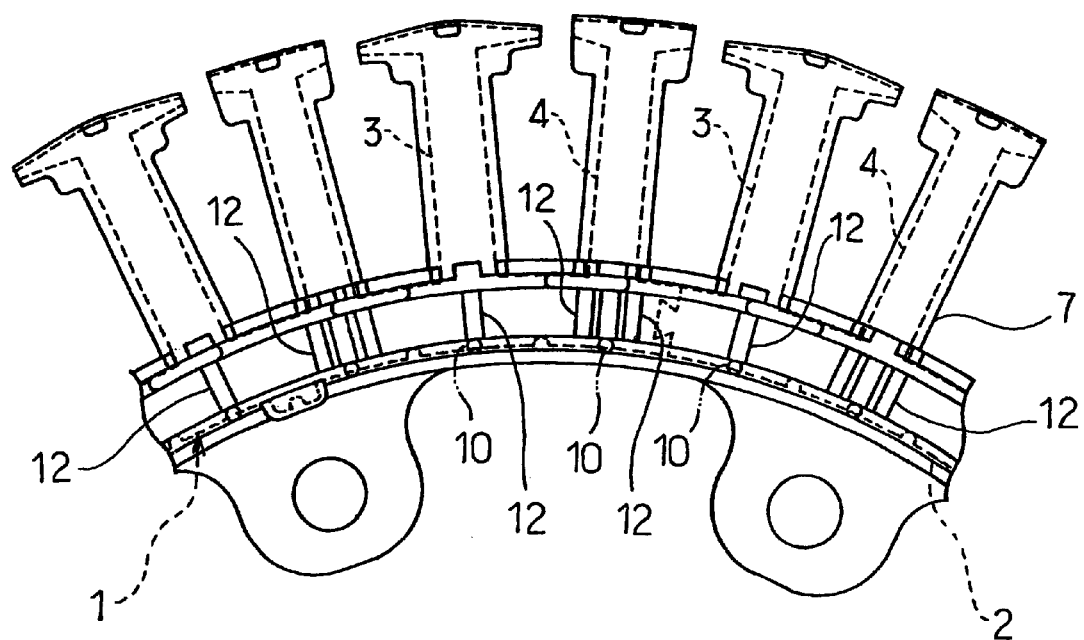
FIG. 6 is a view similar to FIG. 5, showing a stator core of a third embodiment to which the molded stator core in accordance with the present invention is applied.

FIG. 6 illustrates a third embodiment of the invention. The difference between the first and third embodiments will be described. In the third embodiment, the covering member 7 near the axial end face of the yoke 2 is provided with one rib 12 between each larger tooth 3 and the corresponding gate 10 and three ribs 12 between each smaller tooth 4 and the corresponding gate 10. Further, the covering member 7 near the axial end face of the yoke 2 is provided with no rib 13 between each tooth 3 and the tooth 4 adjacent to each tooth 3. Additionally, the covering member 7 near the axial end faces of the teeth 3 and 4 is provided with no ribs 15 to 17 and 19 to 21, respectively.

According to the above-described construction, an amount of resin of the covering member 7 near the axial end face of the yoke 2 is larger around each smaller tooth 4 than around each larger tooth 3 depending upon the number of ribs 12. Consequently, the same effect can be achieved from the third embodiment as from the second embodiment.

Figure 7:
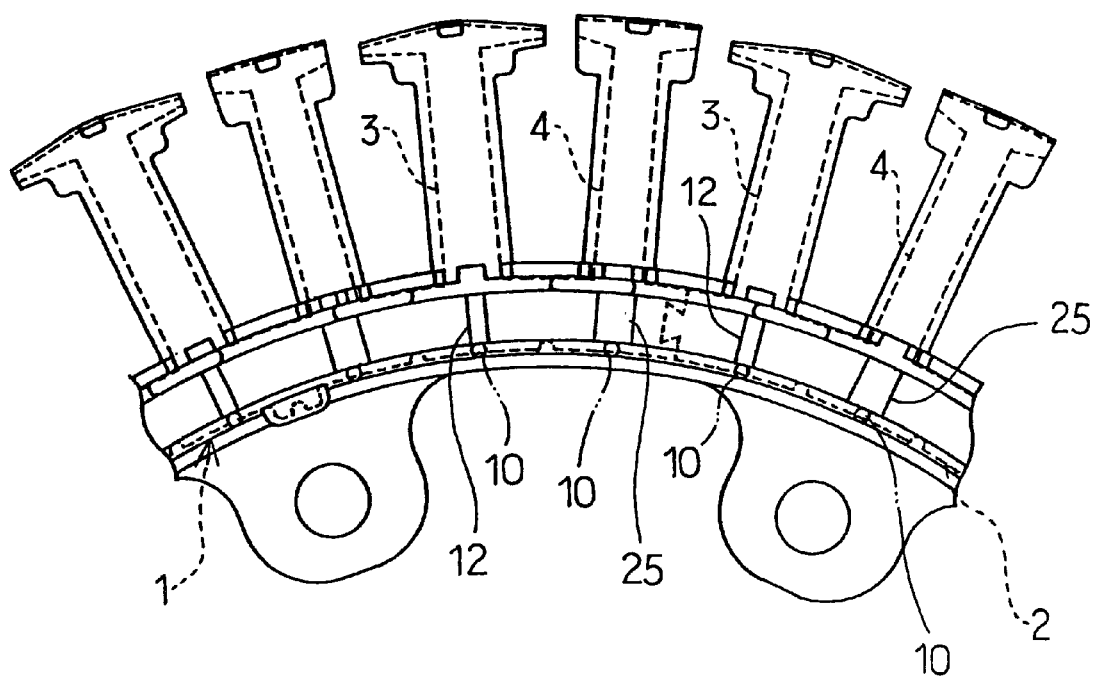
FIG. 7 is also a view similar to FIG. 5, showing a stator core of a fourth embodiment to which the molded stator core in accordance with the present invention is applied.

FIG. 7 illustrates a fourth embodiment of the invention. The difference between the third and fourth embodiments will be described. In the fourth embodiment, the covering member 7 near the axial end face of the yoke 2 is provided with the rib 12 between each larger tooth 3 and the corresponding gate 10 and a rib 25 which is larger than each rib 12 and is provided between each smaller tooth 4 and the corresponding gate 10.

According to the above-described construction, an amount of resin of the covering member 7 near the axial end face of the yoke 2 is larger around each smaller tooth 4 than around each larger tooth 3 depending upon the thicknesses of ribs 12 and 25. Consequently, the same effect can be achieved from the fourth embodiment as from the second and third embodiments.

Figure 8:
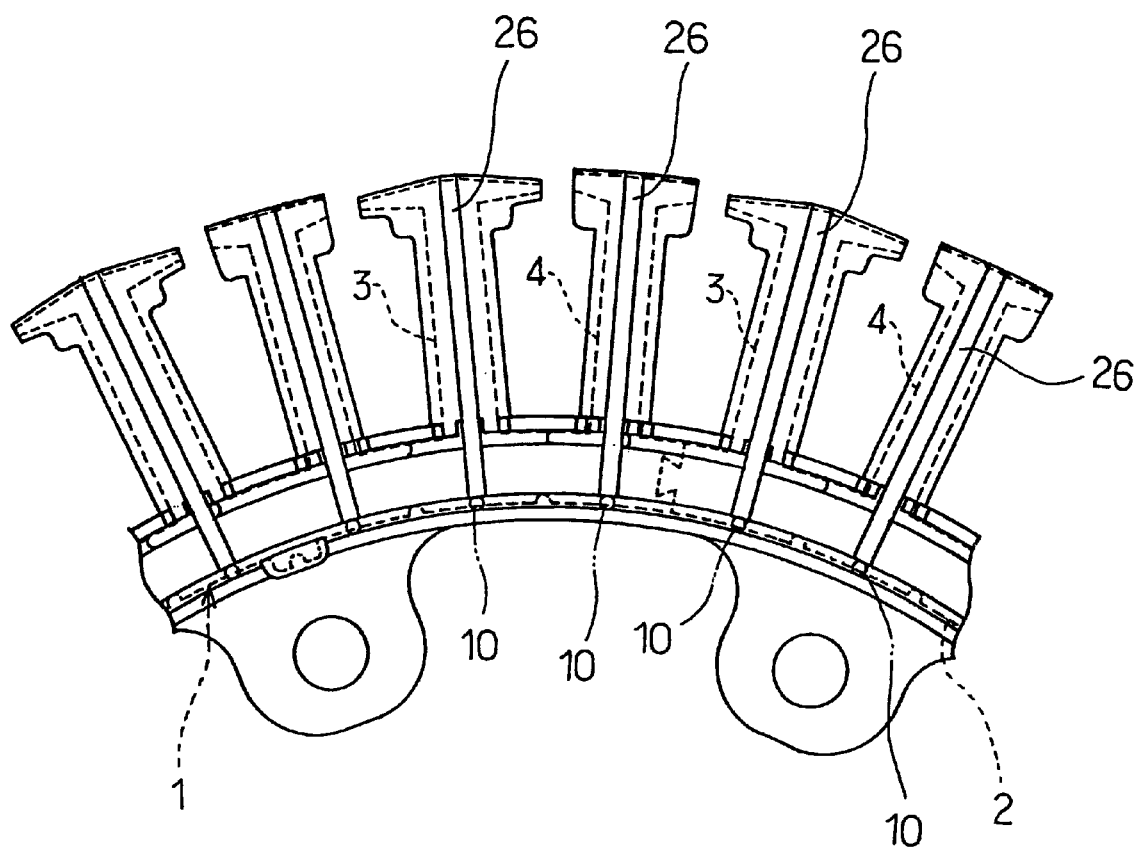
FIG. 8 is also a view similar to FIG. 5, showing a stator core of a fifth embodiment to which the molded stator core in accordance with the present invention is applied.

FIG. 8 illustrates a fifth embodiment of the invention. The difference between the first and fifth embodiments will be described. In the fifth embodiment, the covering member 7 near the axial end face of the stator core 1 is provided with ribs 26 formed integrally therewith and extending continuously from the gates to the distal ends of the teeth 3 and 4 respectively. The molten resin easily flows along the ribs 26 from the gates 10 to the distal ends of the teeth 3 and 4, respectively. Consequently, occurrence of portions not covered with the covering member 7 and burrs can be prevented and the moldability of the covering member 7 can be improved.

Figure 9:
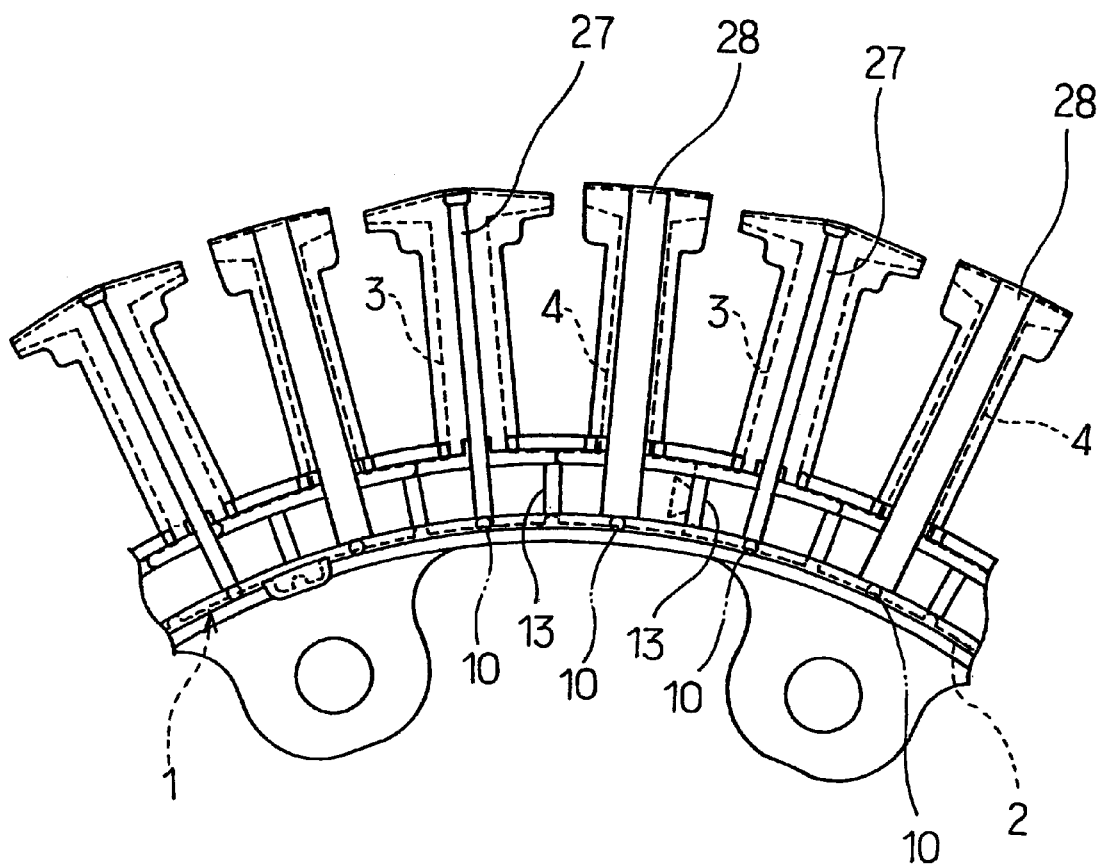
FIG. 9 is also a view similar to FIG. 5, showing a stator core of a sixth embodiment to which the molded stator core in accordance with the present invention is applied.

FIG. 9 illustrates a sixth embodiment of the invention. The difference between the first and sixth embodiments will be described. In the sixth embodiment, the covering member 7 is provided, near the axial end face of the yoke 2, with a rib 27 formed integrally therewith and extending from the gate 10 to the distal end of each corresponding larger tooth 3. The covering member 7 is further provided with a rib 28 formed integrally therewith and extending from the gate 10 to the distal end of the each corresponding smaller tooth 4. Each rib 27 has the same thickness as each rib 12, whereas each rib 28 has a larger thickness than each rib 27. Consequently, the same effect can be achieved from the sixth embodiment as from the third, fourth and fifth embodiments.

Figure 10:
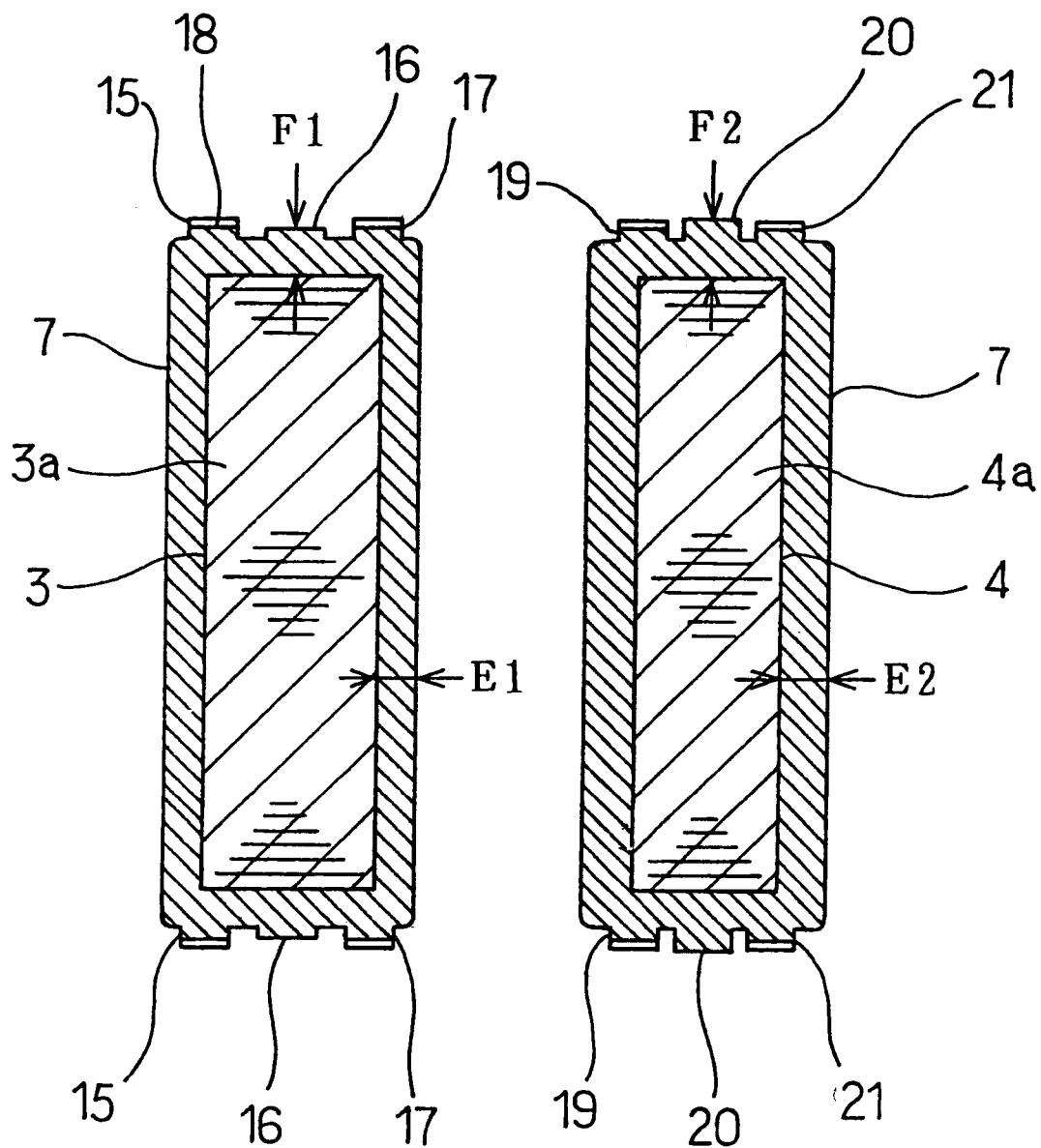
FIG. 10 is a longitudinal side section of the large and small teeth of a stator core of a seventh embodiment to which the molded stator core in accordance with the present invention is applied.

FIG. 10 illustrates a seventh embodiment of the invention. The difference between the first and seventh embodiments will be described. In the seventh embodiment, the portion of the covering member 7 covering each larger tooth 3 has a thickness E1 set to be larger than a thickness E2 of the portion thereof covering each smaller tooth 4. Further, a thickness in the portion of the covering member 7 corresponding to the central one 16 of three ribs 15 to 17 provided to correspond to each tooth 3 is set to be smaller than a thickness in the portion of the covering member 7 corresponding to the central one 20 of three ribs 19 to 21 provided to correspond to each tooth 4. As the result of this construction, an amount of resin of the covering member 7 covering each tooth 3 is rendered approximately equal to an amount of resin of the covering member 7 covering each tooth 4. Consequently, since amounts of resin flowing from the gates 10 to the teeth 3 and 4 and flowability are uniformed, the moldability of the covering member 7 can be improved.

Figure 13:
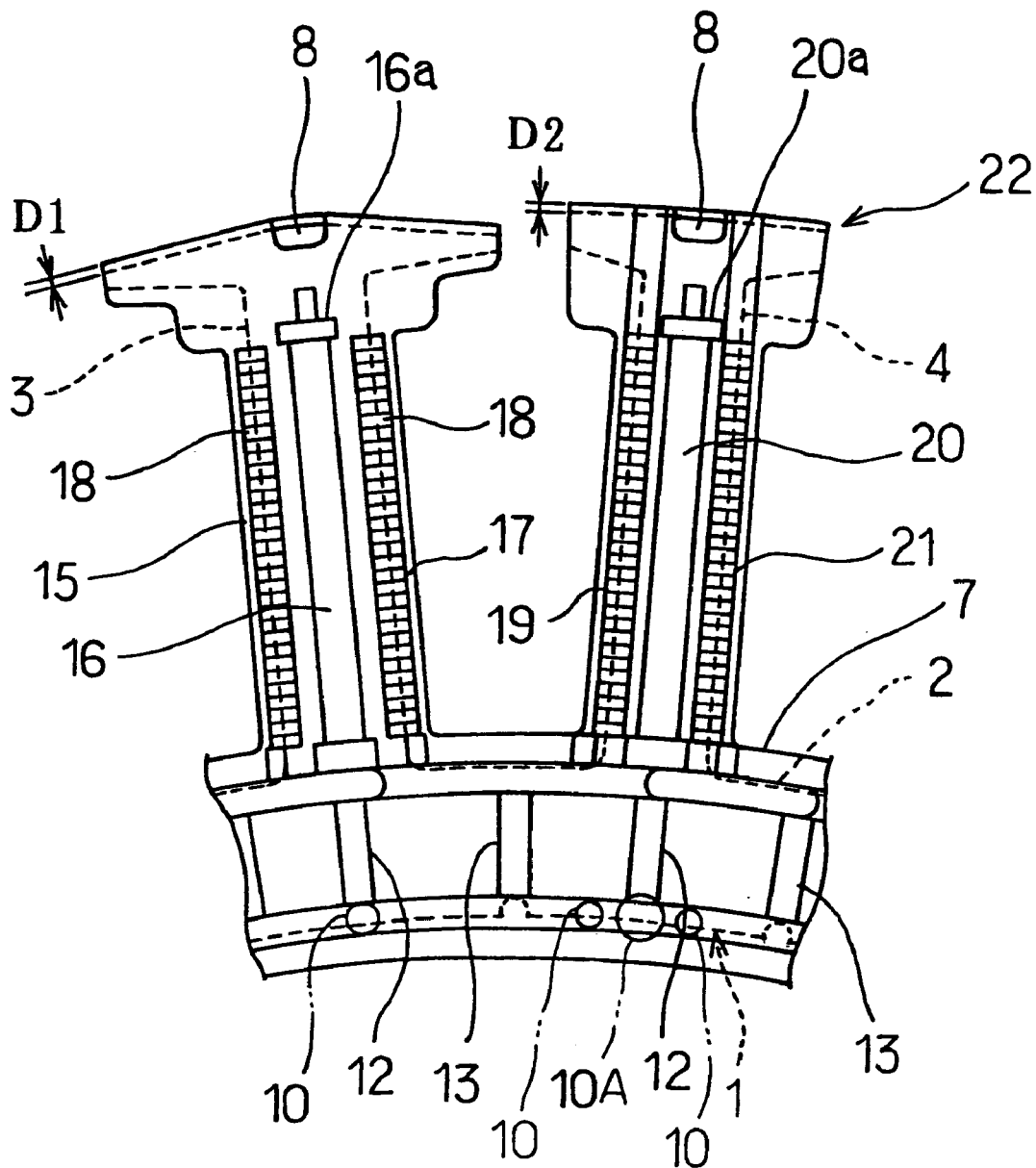
FIG. 13 is a view similar to FIG. 1, showing a stator core of an eighth embodiment to which the molded stator core in accordance with the present invention is applied.

FIG. 13 illustrates an eighth embodiment of the invention. The difference between the first and eighth embodiments will be described. In the eighth embodiment, the number of gates 10 provided in the upper die 50a so as to correspond to the smaller teeth 4 is larger than the number of gates 10 provided so as to correspond to the larger teeth 4. The gates 10 corresponding to each tooth 4 include one gate 10A having a larger diameter than the other gates 10. Since the resin easily flows to each tooth 4 through the gates 10 and 10A, the moldability of the covering member 7 can be improved.

Figure 14:
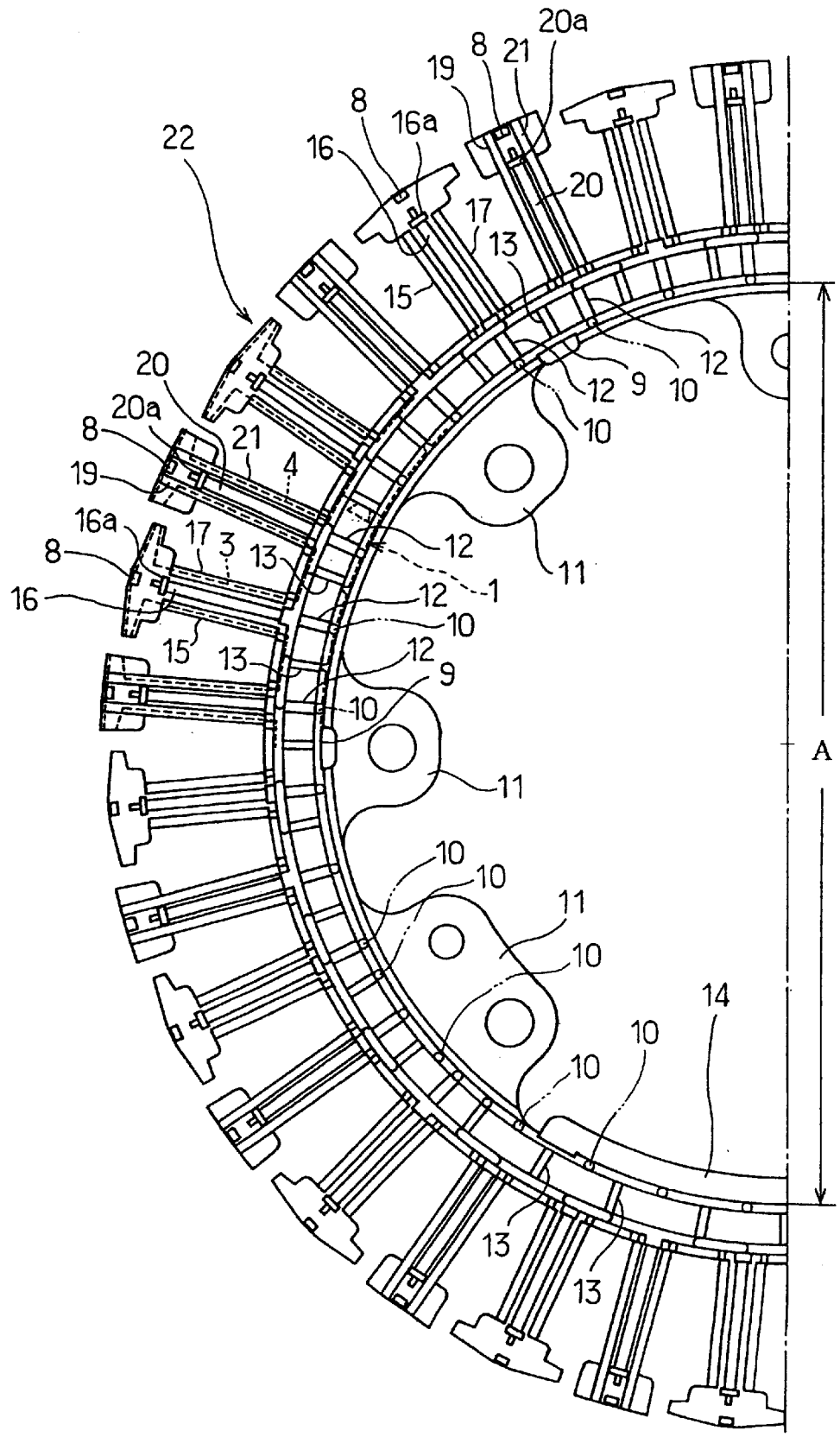
FIG. 14 is a view similar to FIG. 3, showing a stator core of a ninth embodiment to which the molded stator core in accordance with the present invention is applied.

FIG. 14 illustrates a ninth embodiment of the invention. The difference between the first and ninth embodiments will be described. The number of gates 10 near to each mounting portion 11 is larger than the number of gates 10 far away from each mounting portion 11. In this construction, too, the molten resin easily flows from the gates 10 to the teeth 3 and 4 locationally corresponding to each mounting portion 11 and consequently, the moldability of the covering member 7 can be improved.

In a modified form, the sectional area of the resin may be adjusted by the ribs 12 and 13. Further, the numbers of the ribs 13, 15 to 17 and 19 to 21 may be changed.

Although the stator core 1 is divided into a plurality of the divided cores 5 connected together in the foregoing embodiments, a single stator core may be provided.

In the eighth embodiment, the number of gates 10 provided in the upper die 50a so as to correspond to the smaller teeth 4 may be larger than the number of gates 10 provided so as to correspond to the larger teeth 4 without the gate 10A. Alternatively, only the gate 10A may be provided without the gates 10 corresponding to each tooth 4 including one gate 10A having a larger diameter than the other gates 10.

Although the larger number of gates 10 is disposed near each mounting portion 11 in the ninth embodiment, the gate 10A having a larger diameter may be provided as in the eighth embodiment, instead.

The foregoing description and drawings are merely illustrative of the principles of the present invention and are not to be construed in a limiting sense. Various changes and modifications will become apparent to those of ordinary skill in the art. All such changes and modifications will be seen to fall within the scope of the appended claims.

We claim:

1. A molded stator core for an electric motor comprising:
   a stator core including a yoke and a plurality of teeth formed on an outer periphery of the yoke, the teeth having different types; and
   a covering member molded from an insulating resin so as to cover substantially the overall stator core before windings are wound thereon;
   wherein an amount of resin covering each tooth of a first type is approximated to an amount of resin covering each tooth of a second type.

2. The molded stator core according to claim 1, wherein the covering member has a plurality of ribs each of which is located between the yoke and a distal end of the corresponding tooth, and the amount of resin of the covering member is approximated between the teeth of the first and second types by varying a sectional area of each rib.

3. The molded stator core according to claim 2, wherein each rib extends along the corresponding tooth and has a winding groove guiding the winding wound on the tooth.

4. The molded stator core according to claim 1, wherein the covering member has a plurality of ribs located between the yoke and distal ends of the corresponding teeth respectively and the amount of resin of the covering member is approximated between the teeth of the first and second type by changing the number of the ribs.

5. The molded stator core according to claim 4, wherein each rib extends along the corresponding tooth and has a winding groove guiding the winding wound on the tooth.

6. The molded stator core according to claim 1, wherein an amount of resin molded into a portion of the covering member near the yoke and corresponding to each tooth of the first type is set to be larger than an amount of resin molded into a portion of the covering member near the yoke and corresponding to each tooth of the second type.

7. The molded stator core according to claim 1, wherein the covering member covers outer peripheries of distal ends of the teeth and includes a plurality of ribs located between the yroke and the distal ends of the teeth respectively, the ribs including those corresponding to portions of the covering member having smaller thicknesses at the distal ends of the teeth and reaching the distal ends of the teeth.

8. The molded stator core according to claim 1, wherein an amount of resin molded into a portion of the covering member covering each tooth of the first type is set to be approximately equal to an amount of resin molded into a portion of the covering member covering each tooth of the second type.

9. The molded stator core according to claim 1, wherein the covering member covers an outer periphery of each tooth substantially to the extent of an outer periphery of a distal end of each tooth.

10. The molded stator core according to claim 1, wherein a material for the covering member comprises a mixture of the resin and glass, and the glass has a mixture ratio ranging 20 to 30 percentage by weight, a melt viscosity ranging 150 to 200 Pa•s, a bending elastic modulus ranging 5000 to 10000 MPa, and a melt flow rate ranging 15 to 50 g/10 min.

11. The molded stator core according to claim 1, wherein a portion of the covering member covering each tooth of the first type has a larger thickness than a portion of the covering member covering each tooth of the second type.

12. A molded stator core for an electric motor comprising:
- a stator core including a yoke and a plurality of teeth formed on an outer periphery of the yoke, the teeth having different types;
- a covering member molded from an insulating resin so as to cover substantially the overall stator core before windings are wound thereon; and
- a mounting portion provided integrally with the covering member so as to be located at an inner peripheral side of the yoke;
- wherein an amount of resin in a portion of the covering member provided with the mounting portion near the yoke is larger than an amount of resin in another portion of the covering member provided with no mounting portion near the yoke.

13. The molded stator core according to claim 12, wherein the covering member is provided with a plurality of resin guiding portions near an axial end face of the yoke, each resin guiding portion guiding the resin from the yoke to the tooth side, the resin guiding portions being located at a portion of the covering member corresponding to the mounting portion and a portion of the covering member near the mounting portion.

14. The molded stator core according to claim 12, wherein the covering member includes, at the inner peripheral side thereof, a thicker portion located so as not to correspond to the mounting portion.

15. The molded stator core according to claim 12, wherein the covering member covers an outer periphery of each tooth substantially to the extent of an outer periphery of a distal end of each tooth.

16. The molded stator core according to claim 12, wherein a material for the covering member comprises a mixture of the resin and glass, and the glass has a mixture ratio ranging 20 to 30 percentage by weight, a melt viscosity ranging 150 to 200 Pa•s, a bending elastic modulus ranging 5000 to 10000 MPa, and a melt flow rate ranging 15 to 50 g/10 min.

17. A molded stator core for an electric motor comprising:
- a stator core including a yoke having an inner diameter equal to or larger than 100 mm and a plurality of teeth formed on an outer periphery of the yoke, the teeth having different types;
- a covering member molded from an insulating, resin so as to cover substantially the overall stator core before windings are wound thereon; and
- a mounting portion provided integrally with the covering member so as to be located at an inner peripheral side of the yoke;
- wherein an amount of resin covering each tooth of a first type is approximated to an amount of resin covering each tooth of a second type; and
- wherein an amount of resin in a portion of the covering member provided with the mounting portion near the yoke is larger than an amount of resin in another portion of the covering member provided with no mounting portion near the yoke.

18. The molded stator core according to claim 17, wherein the covering member has a plurality of ribs each of which is located between the yoke and a distal end of the corresponding tooth, and the amount of resin of the covering member is approximated between the teeth of the first and second types by varying a sectional area of each rib.

19. The molded stator core according to claim 18, wherein each rib extends along the corresponding tooth and has a winding groove guiding the winding wound on the tooth.

20. The molded stator core according to claim 17, wherein the covering member has a plurality of ribs located between the yoke and distal ends of the corresponding teeth respectively and the amount of resin of the covering member is approximated between the teeth of the first and second types by changes the number of the ribs.

21. The molded stator core according to claim 20, wherein each rib extends along the corresponding tooth and has a winding groove guiding the winding wound on the tooth.

22. The molded stator core according to claim 3, wherein the covering member is provided with a plurality of resin guiding portions near an axial end face of the yoke, each resin guiding portion guiding the resin from the yoke to the tooth side, the resin guiding portions being located at a portion of the covering member corresponding to the mounting portion and a portion of the covering member near the mounting portion.

23. The molded stator core according to claim 17, wherein the covering member includes, at the inner peripheral side thereof, a thicker portion located so as not to correspond to the mounting portion.

24. The molded stator core according to claim 17, wherein an amount of resin molded into a portion of the covering member near the yoke and corresponding to each tooth of the first type is set to be larger than an amount of resin molded into a portion of the covering member near the yoke and corresponding to each tooth of the second type.

25. The molded stator core according to claim 17, wherein an amount of resin molded into a portion of the covering member covering each tooth of the first type is set to be approximately equal to an amount of resin molded into a portion of the covering member covering each tooth of the second type.

26. The molded stator core according to claim 17, wherein a material for the covering member comprises a mixture of the resin and glass, and the glass has a mixture ratio ranging 20 to 30 percentage by weight, a melt viscosity ranging 150 to 200 Pa•s, a bending elastic modulus ranging 5000 to 10000 MPa, and a melt flow rate ranging 15 to 50 g/10 min.

27. The molded stator core according to claim 17, wherein the covering member covers outer peripheries of distal ends of the teeth and includes a plurality of ribs located between the yoke and the distal ends of the teeth respectively, the ribs including those corresponding to portions of the covering member having smaller thicknesses at the distal ends of the teeth and reaching the distal ends of the teeth.

28. A molded stator core for an electric motor comprising:
- a stator core including a yoke and a plurality of teeth formed on an outer periphery of the yoke, the teeth having different types;
- a covering member molded from an insulating resin so as to cover substantially the overall stator core before windings are wound thereon; and
- a plurality of ribs provided integrally with the covering member so as to extend continuously from the yoke to distal ends of the corresponding teeth respectively.

29. The molded stator core according to claim 28, wherein each rib extends along the corresponding tooth and has a winding groove guiding the winding wound on the tooth.

30. The molded stator core according to claim 28, wherein a material for the covering member comprises a mixture of the resin and glass, and the glass has a mixture ratio ranging 20 to 30 percentage by weight, a melt viscosity ranging 150 to 200 Pa•s, a bending elastic modulus ranging 5000 to 10000 MPa, and a melt flow rate ranging 15 to 50 g/10 min.

* * * * *